Patented Dec. 6, 1938

2,139,108

UNITED STATES PATENT OFFICE 2,139,108

PROCESS FOR THE PRODUCTION OF BUTYL ALCOHOL BY FERMENTATION

Cornelius F. Arzberger, Terre Haute, Ind., assignor to Commercial Solvents Corporation, Terre Haute, Ind., a corporation of Maryland No Drawing. Application February 8, 1937, Serial No. 124,691. In Great Britain April 8, 1936

8 Claims. (Cl. 195—44)

My invention relates to the production of butyl alcohol and other valuable products by the fermentation of sugar-containing solutions. More specifically my invention relates to the production of normal butyl alcohol, acetone, and ethyl alcohol by the fermentation of sugar solutions by means of a new type of bacteria described herein.

It has previously been known that sugar solutions could be fermented by means of certain types of butyl alcohol producing bacteria, and this type of fermentation has been found to be superior in a number of respects to the starch fermentation by means of bacteria of the type *Clostridium acetobutylicum* (Weizmann) first commercially employed in this field. However, the essentially sugar-fermenting bacteria employed up to the present time have had certain disadvantages, particularly in the length of time of the fermentation and in the limitation as to the maximum sugar content of mashes which could be fermented with optimum yields. Such prior bacteria have required from 60 to 72 hours or more to complete the fermentation of a commercial mash, and optimum yields have not been obtainable with mashes containing sugar in concentrations substantially greater than 50 grams per liter. I have now discovered a new type of sugar-fermenting butyl alcohol producing bacteria which are greatly superior in these respects, being able to produce optimum yields in mashes containing at least 25% more carbohydrate than previously successfully used, and being able to complete the fermentation in about one half the time previously necessary, or even less. The bacteria of my present invention possess certain other advantages which also may be seen from the description and examples given below.

The bacteria of my present invention may be described and readily distinguished from other bacteria by means of appropriate characteristics of the descriptive chart of the Society of American Bacteriologists, and other distinguishing characteristics:

Name of organism: *Clostridium saccharo-butyl-acetonicum-liquefaciens*.

I. Morphology
 1. Vegetative cells
  Medium used: potato glucose medium (300 gm. potato, moist weight, 10 gm. glucose, 1 gm. ammonium sulfate, 3 gm. calcium carbonate per liter)
  Incubation: 20 hours at 30° C.
  Stain used: negative nigrosin, without heat
  Form: short and long rods
  Arrangement: single and chains
  Usual limits of length: 2.2–13.0$\mu$; of diameter: 0.8–3.6$\mu$
  Size of majority: 6.0 x 1.7$\mu$
  Ends: rounded
 2. Sporangia: present
  Medium used: potato glucose medium (cf. I, 1 above)
  Incubation: 36 hours at 30° C.
  Stain used: negative nigrosin, without heat
  Form: spindled and clavate
 3. Endospores: present
  Medium used: potato glucose medium (cf. I, 1 above)
  Incubation: 72 hours at 30° C.
  Stain used: negative nigrosin, without heat
  Location of endospores: subterminal to terminal
  Form: cylindrical with rounded ends, some oval
  Usual limits of length: 1.7–3.9$\mu$; of diameter: 1.1–1.8$\mu$
  Size of majority: 2.7 x 1.4$\mu$
 4. Motility
  Medium used: glucose broth (5 gm. peptone, 3 gm. beef extract, 10 gm. glucose per liter)
  Incubation: 20 hours at 30° C.
  Motility: motile
  Medium used: nutrient agar (agar 17 gm., glucose 20 gm., molasses 8 gm., peptone 5 gm., beef extract 3 gm., ammonium sulfate 1 gm. per liter)
  Incubation: 40 hours at 30° C.
  Motility: motile
 5. Flagella: present
  Medium used: molasses mash (sugar 75 gm., calculated as sucrose, supplied in the form of Cuban molasses, ammonium sulfate 3.8 gm., calcium carbonate 4.3 gm. and calcium acid phosphate 0.2 gm. per liter of mash)
  Incubation: 22 hours at 30° C.
  Stain used: Casares-Gil
  Attachment: Peritrichous 6. Irregular forms: present
    Medium used: potato glucose medium (cf. I, 1 above)
    Incubation: 72 hours at 30° C.
7. Staining reactions
    (a) Gram stain
        Medium used: potato glucose medium (cf. I, 1 above)
        Incubation: 30° C.
        Stain used: Kopeloff-Beerman modification
        Stain: positive-variable
    (b) Iodine stain:
        Medium used: nutrient agar (cf. I, 4 above)
        Incubation: 48 hours at 30° C.
        Granulose: positive II. Cultural characteristics
  1. Agar colonies (observations immediately on removal from anaerobic incubation vessel)
      Medium used: nutrient agar (cf. I, 4 above)
      Incubation: 48 hours at 30° C.
      Form: circular to irregular
      Surface: rough and smooth
      Edge: lobar-lobulate and entire
      Elevation: convex
      Optical character: translucent to opaque
  2. Agar stroke
      Medium used: nutrient agar (cf. I, 4 above)
      Incubation: 96 hours at 30° C.
      Growth (anaerobic): moderate to abundant
      Form: scattered, spreading
      Lustre: glistening
      Chromogenesis: none to light cream
      Odor: butyric and butylic
      Consistency: butyrous to mucid
      Change in medium: none
  3. Nutrient broth
      Medium: nutrient broth (5 gm. peptone, 3 gm. beef extract per liter)
      Incubation: 30° C.
      Surface growth (72 hours): none
      Clouding (72 hours): slight
      Odor (72 hours): none III. Physiological characteristics
  1. Temperature relations
      Optimum fermentation temperature: 29–31° C.
  2. Relation to reaction of medium
      Optimum final pH: 5.6–6.2
  3. Chromogenesis
      Nutrient agar: none to light cream
      Nutrient gelatin: none
      Potato: none to light cream
  4. Production of indole
      Medium used: glucose tryptophane (glucose 2.5 gm., tryptophane 1.0 gm. per liter)
      Incubation: 96 hours at 36° C.
      Test used: p-dimethylaminobenzaldehyde
      Indole: absent
  5. Production of hydrogen sulphide
      Medium used: lead acetate agar (agar 15 gm., peptone, "Bactotryptone", 20 gm., glucose 10 gm., lead acetate 0.2 gm. per liter)
      Incubation: 72 hours at 30° C.
      Hydrogen sulphide: absent, or present only in traces
  6. Relation to oxygen
      (a) Medium used: nutrient agar (cf. I, 4 above)
          Incubation: 48 hours at 30° C.
          Growth (aerobic incubation): absent
          Growth (anaerobic incubation): abundant
      (b) Medium used: potato glucose medium (cf. I, 1 above) in deep tubes, freshly steamed
          Incubation: 24 hours at 30° C.
          Growth (aerobic incubation): abundant
          Growth (anaerobic incubation): abundant
  7. Litmus milk
      Incubation: 30° C.
      Reaction (3 days): acid
      Curd (15 days): acid curd
      Peptonization (15 days): partial
      Reduction of litmus (2 days): reduced
  8. Nitrate reduction
      Medium: Asparagin-sodium citrate-nitrate medium (asparagin 1 gm., sodium citrate 8.5 gm., potassium nitrate 1 gm., mono-potassium phosphate 1 gm., magnesium sulphate ($MgSO_4.7H_2O$) 1 gm., calcium chloride 0.2 gm. per liter)
      Incubation: 7 days at 30° C.
      Test used: alpha-naphthylamine-sulfanilic acid test for nitrites
      Reduction: variable
  9. Gelatin liquefaction
      Medium used: gelatin 120 gm., glucose 10 gm., peptone 5 gm., beef extract 3 gm. per liter
      Incubation: 12 days at 24° C.
      Liquefactaion: complete
  10. Fermentation reactions
      Medium used: nutrient broth (nutrient broth of I, 4 plus 10 gm. of the carbohydrate or alcohol to be tested, per liter)

| Carbohydrate or alcohol | Acid production | Gas production |
|---|---|---|
| Arabinose | + | + |
| Rhamnose | − | − |
| Xylose | + | + |
| Glucose | + | + |
| Fructose | + | + |
| Galactose | + | + |
| Mannose | + | + |
| Lactose | + | + |
| Sucrose | + | + |
| Maltose | + | + |
| Raffinose | + | + |
| Melezitose | | |
| Corn starch | + | + |
| Soluble starch | + | + |
| Inulin | + | + |
| Dextrin | + | + |
| Glycogen | + | + |
| Glycerol | − | − |
| Erythritol | | |
| Mannitol | − | − |
| Sorbitol | − | − |
| Dulcitol | | |
| Salicin | + | + |
| Alpha-methyl glucoside | + | + |

In addition to the properties of the descriptive chart given above, these bacteria are further characterized by their fermentation yields in sugar mashes of relatively high sugar content, e. g., from 65 to 75 grams of sugar per liter, in nutrient corn mash, nutrient soluble starch mash, and in mash consisting solely of corn meal and water. Normal ranges and average values for these characteristics are reported in the table below:

Table I

| | Mash composition, grams per liter | Yield range percent based on weight of carbohydrate | Average yield percent based on weight of carbohydrate |
|---|---|---|---|
| Cuban molasses (sucrose equivalent) | 75 | 27-33 | 29-31 |
| $(NH_4)_2SO_4$ | 3.8 | | |
| $CaCO_3$ | 4.1 | | |
| $CaH_4(PO_4)_2$ | 0.2 | | |
| Soluble starch | 50 | 20-28 | 25-27 |
| Peptone | 5 | | |
| Beef extract | 3 | | |
| $(NH_4)_2SO_4$ | 1 | | |
| $CaCO_3$ | 4 | | |
| Corn meal | 70 | 20-28 | 22-25 |
| $(NH_4)_2SO_4$ | 3 | | |
| $CaCO_3$ | 4 | | |
| Corn meal | 70 | 0-5 | 0-1 |

The outstanding characteristic of these bacteria from a commercial standpoint is their ability to produce consistently yields of 27-33% of butyl alcohol, acetone, and ethyl alcohol, from mashes containing from 65 to 75 grams of fermentable sugar per liter, as opposed to yields not consistently above 25-26% obtainable in such mashes with previously known bacteria. In determining this characteristic a mash should be utilized which contains the necessary nutrients for the bacteria, and the mash should be maintained under optimum temperature and pH conditions throughout the fermentation. A healthy active culture of bacteria should be employed and the usual precautions should be taken as to sterilizing the mash, avoiding contamination, and the like. A medium such as the molasses medium illustrated in Table I above may suitably be employed for this test, but, in view of possible variations due to differences in the composition of molasses samples from various sources, it may be desirable to employ for this test a synthetic medium such as the following.

| | Grams per liter |
|---|---|
| Sucrose | 50 |
| Glucose | 25 |
| Calcium carbonate | 6 |
| Ammonium sulphate | 6 |
| Dipotassium phosphate | 1 |
| Monopotassium phosphate | 1 |
| Magnesium sulphate | 1.5 |
| Yeast water (10% concentration) | 10% by volume. |

When employing sugar mashes, such as the molasses mash or synthetic sugar mash referred to above, the bacteria of the present invention will be found to produce butyl alcohol, acetone, and ethyl alcohol in ratios within the following ranges:

| | Percent |
|---|---|
| Butyl alcohol | 55-74 |
| Acetone | 24-39 |
| Ethyl alcohol | 2-6 |

The gaseous products of the fermentation with these bacteria comprise carbon dioxide and hydrogen, usually in a ratio of the order of 60 parts $CO_2$ to 40 parts $H_2$.

While the yield values given in Table I above are characteristic of the bacteria in the particular mashes and under the particular conditions specified, it is to be understood that considerable variation may be expected if these conditions are appreciably changed. As has previously been noted, various samples of molasses of the same general type may be found to give different yields with the same culture of bacteria. Likewise, different types of molasses will often be found to give substantially different yields. For example, beet molasses generally gives considerably higher yields of solvents than any of the types of cane molasses. It will also be found that supplementary nutrients, such as distillation slop from a yeast fermentation of a saccharified grain mash, may affect the yield. Nutrients of this type tend, in general to increase the yield obtainable. Similarly, if ammonia is utilized in place of calcium carbonate to regulate the pH of the mash throughout the fermentation, the yield tends to be slightly increased.

The solvent ratio produced by the bacteria will also depend on a number of factors, such as the particular strain of bacteria employed, and the composition of the mash. Different acetone ratios may be secured with different types of molasses. Porto Rican molasses, for example, generally gives somewhat higher acetone ratios than Cuban molasses. The use of supplementary nutrients, such as yeast distillation slop, generally increases the acetone ratio and ammonia neutralization tends to give acetone ratios different from those obtained with calcium carbonate neutralization. All of these variables give rise to a rather broad range of solvent ratios obtainable with these bacteria, which may even exceed the average range indicated above, but it should be understood that a considerably narrower range of solvent ratio is usually secured with any particular culture if the mash composition and fermentation conditions are not varied.

The bacteria of the present invention have certain requirements as to nutrients and pH conditions which must be satisfied to secure optimum yields in the fermentation. For example, these bacteria require degraded protein nitrogen for optimum fermentation. The term degraded protein nitrogen as used here includes intermediate degradation products such as polypeptides, amino acids, etc., and the final degradation product, ammonia, and its salts. Ammonia (or an ammonium compound, such as ammonium sulphate) alone has been found to give satisfactory yields of solvents but it is preferred to use a mixture of ammonia and a higher form of nitrogenous material such as yeast water, steep water, distillation slop, or the like. These bacteria likewise require phosphate nutrients, as in the case of most other types of bacteria. Many natural sources of carbohydrate, such as molasses, contain sufficient phosphates but in case of deficiency this may be supplied in the form of calcium acid phosphate or any of the other common phosphates employed for this purpose.

The amount of nitrogenous and mineral nutrients to be incorporated in the mash will, of course, depend to a certain extent upon the type of material employed as a source of carbohydrate. The particular optimum amounts for any type of mash can readily be determined by simple preliminary experiments. However, it may be said that, in general, from 4 to 6% of ammonium sulphate or its equivalent, and preferably approximately 5%, based on the weight of the carbohydrate in the mash, and from 0.2% to 0.6% and preferably 0.3% of calcium acid phosphate, or its equivalent, should be employed in mashes prepared from high test molasses, or other carbohydrate material low in nutrient content. Smaller amounts may, of course, be employed in the case of other raw materials which naturally contain greater amounts of nitrogenous and mineral nutrients.

It will be noted that the bacteria as described above have an optimum final pH within the range 5.6 to 6.2. It should be understood, of course, that this is merely an optimum range and that high yields are obtainable with a much wider range of final pH. I prefer to control the acidity of the mash during the fermentation whereby the final pH secured by the action of the bacteria falls within the range pH 5.2–6.4. However, under certain conditions, particularly in large scale operations utilizing mashes containing high test molasses and buffering materials in addition to neutralizing agents, high yields may be obtained with final pH values considerably below 5.2. Similarly, in certain types of mashes, high yields may be obtained with final pH values considerably above 6.4. The control of the hydrogen ion concentration to secure a final pH within the desired range may be effected by supplying alkaline neutralizing agents to the fermenting mash throughout the fermentation. The neutralizing agents may be supplied throughout the fermentation either by continuous or semi-continuous addition of soluble neutralizing agents such as ammonium hydroxide, or by incorporating into the initial mash an excess of an insoluble neutralizing agent, such as calcium carbonate. If the former procedure is employed, the ammonium hydroxide will serve the dual function of neutralizing agent and nitrogenous nutrient, thus avoiding the necessity of incorporating an ammonium salt in the mash. If calcium carbonate, or other insoluble non-toxic basic neutralizing agent, is employed to control the hydrogen ion concentration of the fermenting mash, such material should usually be incorporated in the mash in amounts of from 2 to 10%, and preferably approximately 5%, based on the weight of the carbohydrate in the mash, in excess of that required to neutralize any initial acidity. Equivalent amounts of calcium acetate, calcium butyrate, or other soluble salts of a fermentable organic acid and a soluble or insoluble base, may be employed in place of the insoluble neutralizing agent. If ammonia is employed as the neutralizing agent, this should be incorporated in the mash in amounts of from 1 to 2% of NH$_3$, and preferably approximately 1.4%, based on the weight of the carbohydrate in the mash. These amounts of neutralizing agents, however, are not critical and may vary somewhat depending upon the alkali or buffer content of the mash. Here again one skilled in the art may readily determine the optimum concentration for a given mash by simple preliminary experiments.

Different strains of these bacteria may be found to differ to a slight extent with respect to their tendency to produce undue acidity in the fermentation or their susceptibility to alkali in the neutralizing process employed for controlling the pH of the fermentation. For example, two strains of bacteria both having the same optimum final pH range may differ in their acid producing tendency to an extent such that for one strain a relatively coarse grade of calcium carbonate such as 200 mesh calcite should be employed and for the other strain a fine material, such as freshly precipitated calcium carbonate, should be used for optimum results. Similarly, two strains having the same optimum final pH may differ in their susceptibility to alkali to such an extent that for optimum results when utilizing ammonia to control the pH a larger number of smaller additions of ammonia should be made in the case of one culture than in the case of the other. Such modifications of procedure to obtain optimum results with any particular culture which may be secured may readily be made by those skilled in the art, and simple preliminary experiments will readily determine the preferred conditions.

Such modifications should, of course, also take into account variations in the materials utilized as sources of carbohydrate for the mash. For example, in the case of beet molasses or certain samples of Hawaiian molasses, nutrient content and ash are considerably higher than commonly encountered with Cuban molasses, with the result that a considerable portion of the required neutralizing agents and nutrients is already present in the raw material. For example, in the case of either of these materials it may be found to be unnecessary to supply any additional neutralizing agent, and in the case of beet molasses it is usually unnecessary to supply any additional nitrogenous nutrient. Those skilled in the art can readily adapt mashing procedures to the various types of raw materials employed, and simple preliminary experiments will indicate the optimum conditions.

It is, of course, to be understood that in employing the bacteria of my present invention the usual precautions employed by those skilled in the art in processes of this nature should be employed. For optimum results the final fermentation mash should be inoculated with a suitable concentration, e. g., from 1 to 5% by volume, of a very actively fermenting culture. The inoculant developed for this purpose should preferably be at the height of its activity at the time of inoculation. Similarly, the mashes utilized in the fermentation process should not be heated for unduly long periods during sterilization, or sterilized at unduly high temperatures, in view of the possible adverse effect of such procedures on the yields obtained. The usual precautions as to avoidance of contamination will insure continued operation with satisfactory results, although the bacteria of the present invention may be employed for the fermentation of unsterilized mashes if proper precautions as to cleanliness are taken, and an unusually high concentration of contaminating organisms does not build up in any part of the apparatus.

The bacteria of my invention are available and may be isolated from natural sources in accordance with known procedures of isolation. For instance, cultures have been isolated from various soils, grains, vegetables, and the like. It is probable that not every sample of such materials will contain the bacteria of the present invention, but natural sources containing them are not rare, as illustrated by the different sources above mentioned from which cultures have been isolated. Isolation procedures commonly used in the past for essentially sugar fermenting butyl alcohol producing bacteria, such as enrichment culturing in favorable media, plating on solid media, picking single cells with micropipettes or combinations of these procedures, may be successfully employed for securing cultures of the present group of bacteria, and cultures thus obtained may then be tested for their identifying characteristics in accordance with the procedures suggested above.

The following is illustrative of one method of isolation which has been successfully employed for securing cultures of bacteria of this group. Samples of soil, rotted wood, vegetable seeds, and the like are macerated in sterile water, allowed to settle for a few minutes, and the supernatant liquid is then utilized to inoculate a mash consisting of 50 gm. of degerminated corn meal, and 20 gm. of dried liver per liter. The inoculated liver medium is then pasteurized for ten minutes at 80° C., cooled immediately to 30° C., and incubated for 4 days. The resulting culture is then plated according to standard procedure on agar medium comprising 17 gm. agar, 20 gm. glucose, 8 gm. molasses, 5 gm. peptone, 3 gm. beef extract, and 1 gm. of ammonium sulphate per liter. This agar, after sterilization, should have a pH not lower than 6.8, and preferably in the neighborhood of 7.0. After anaerobic incubation for 72 hours, colonies from these plates are inoculated into potato glucose medium comprising 300 gm. potato (moist weight), 10 gm. glucose, 1 gm. ammonium sulphate, and 3 gm. calcium carbonate per liter. The potato glucose cultures are incubated at 30° C. for a week or longer to insure sporulation of the cultures, and these cultures are then tested for yields of butyl alcohol, acetone, and ethyl alcohol in mashes of high sugar content. Cultures showing promising yields may then be further purified by additional plating or by picking single cells if desired, and high yielding strains may then be tested for the characteristics given in the descriptive chart above.

My invention will now be illustrated by specific examples in which different types of mashes are fermented with bacteria of the type previously described.

*Example I*

A mash containing 75 gm. sugar, calculated as sucrose, in the form of Cuban molasses (50% sugar content), 3.8 gm. ammonium sulphate, and 4.1 gm. 200 mesh calcite, per liter of mash, was inoculated with an active culture of *Clostridium saccharo-butyl-acetonicum-liquefaciens* and incubated at 30° C. for 40 hours. The following results were obtained:

| Final pH | Solvent yield, percent of sugar | Acetone ratio, percent total solvents |
|---|---|---|
| 5.80 | 31.6 | 38.0 |

*Example II*

A mash containing 80 gm. sugar, 4.0 gm. ammonium sulphate, and 4.7 gm. precipitated calcium carbonate per liter of mash, and 15% by volume of screened distillation slop from a yeast fermentation of a saccharified grain mash, was inoculated with an active culture of *Clostridium saccharo-butyl-acetonicum-liquefaciens* and incubated at 30° C. for 40 hours. The following results were obtained:

| Final pH | Solvent yield, percent of sugar | Acetone ratio, percent total solvents |
|---|---|---|
| 5.90 | 29.8 | 38.5 |

*Example III*

A mash containing 75 gm. sugar, calculated as sucrose, in the form of high test Cuban molasses (75.5% sugar content) and 20% by volume of screened distillation slop from a yeast fermentation of a saccharified grain mash was inoculated with an active culture of *Clostridium saccharo-butyl-acetonicum-liquefaciens* and incubated at 30° C. for 40 hours. At the time of inoculation ammonia was added to the mash in an amount sufficient to adjust the pH to 5.9–6.0. When fermentation had progressed to the point at which the pH had dropped to 5.4, hourly additions of ammonia were made for the next nine hours. The total ammonia added constituted 1.4% of $NH_3$ based on the weight of the sugar in the mash. Approximately 10% of this quantity was added to the original mash to adjust the pH to 5.9–6.0 and the remainder was added according to the following schedule: 6% total $NH_3$ at first hourly addition, 7% at second hourly addition, etc., increasing 1% until the ninth addition at which the remaining 14% was added. The following results were secured:

| Final pH | Solvent yield, percent of sugar | Solvent ratio | | |
|---|---|---|---|---|
| | | Percent BuOH | Percent acetone | Percent EtOH |
| 5.90 | 31.4 | 62.9 | 32.9 | 4.2 |

*Example IV*

A mash containing 60 gm. sugar, calculated as sucrose, in the form of Hawaiian molasses (49% sugar content), and 2.3 gm. ammonium sulphate per liter of mash, was inoculated with an active culture of *Clostridium saccharo-butyl-acetonicum-liquefaciens* and incubated at 30° C. for 40 hours. The following results were secured:

| Final pH | Solvent yield, percent of sugar | Acetone ratio, percent total solvents |
|---|---|---|
| 5.73 | 31.3 | 34.5 |

*Example V*

A mash containing 60 gm. per liter of sugar, calculated as sucrose, in the form of beet molasses (48% sugar content), and 25% by volume of screened distillation slop from a yeast fermentation of a saccharified grain mash, was inoculated with an active culture of *Clostridium saccharo-butyl-acetonicum-liquefaciens* and incubated at 30° C. for 48 hours. The following results were secured:

| Final pH | Solvent yield, percent of sugar | Acetone ratio, percent total solvents |
|---|---|---|
| 6.2 | 38.4 | 28.0 |

*Example VI*

A mash containing 90 gm. sugar, calculated as sucrose, in the form of Porto Rican molasses (67% sugar content), 5 gm. ammonium sulphate, 6.3 gm. calcium carbonate, and 0.5 gm. calcium acid phosphate per liter of mash, was inoculated with an active culture of *Clostridium saccharo-butyl-acetonicum-liquefaciens* and incubated at 30° C. for 45 hours. The following results were secured:

| Final pH | Solvent yield, percent of sugar | Acetone ratio, percent total solvents |
|---|---|---|
| 6.2 | 28.6 | 35.5 |

It will be noted from the above examples that satisfactory yields of solvents may be obtained from various types of mashes with the bacteria of the present invention, utilizing, in general, higher sugar concentration mashes and shorter fermentation schedules than can be employed with previously known bacteria. It should be noted that the incubation times given in the above examples actually represent time elapsed before analysis of the fermented mash rather than actual time for completed fermentation. With the organisms of the present invention the fermentation can usually be completed in less than 40 hours, and with certain mashes the fermentations can consistently finish in 29 to 30 hours. This represents less than half of the time usually required for previous fermentations of this type. It may also be seen from Example VI that satisfactory fermentation can be effected in mashes containing sugar concentrations substantially in excess of 75 gm. per liter. With certain types of molasses it is possible to obtain consistently high yields with mashes containing 85 to 90 gm. of sugar per liter, and mashes containing 100 gm., or more, of sugar per liter can be fermented with only slightly reduced yields. It is therefore to be understood that my invention is not to be taken as limited to the fermentation of mashes of any particular sugar concentration, although the bacteria may be identified by their ability to produce specified yields from mashes containing from 65 to 75 gm. of sugar per liter.

It is also to be understood, of course, that the examples given above are illustrative only, and that my invention is not to be construed as limited to the particular procedures specified. Likewise, my invention applies to all bacteria having the combination of characteristics previously set forth, irrespective of any additional characteristics which they may possess. Also, my invention is applicable to the fermentation of mashes containing any fermentable carbohydrate, and to the use of any suitable nutrients or neutralizing agents, other than, or, in addition to those specifically mentioned in the examples. The fermentation procedure may be modified in any respect as long as suitable nutrients are provided and temperature and pH conditions are maintained throughout the fermentation within operative ranges for the particular bacteria employed. In general, it may be said that the use of any equivalents or modifications of procedure which would naturally occur to one skilled in the art is included within the scope of my invention.

My invention now having been described, what I claim is:

1. A process for the production of butyl alcohol, acetone, and ethyl alcohol which comprises subjecting a fermentable carbohydrate mash chosen from the class consisting of nutrient starch mashes and nutrient sugar mashes to the action of *Clostridium saccharo-butyl-acetonicum-liquefaciens*.

2. A process for the production of butyl alcohol, acetone, and ethyl alcohol which comprises subjecting a mash containing sucrose as a principal source of carbohydrate and an ammonium compound as a principal source of nitrogenous nutrient, to the action of *Clostridium saccharo-butyl-acetonicum-liquefaciens*.

3. A process for the production of butyl alcohol, acetone, and ethyl alcohol which comprises subjecting a mash containing sucrose as a principal source of carbohydrate and an ammonium compound as a principal source of nitrogenous nutrient, to the action of *Clostridium saccharo-butyl-acetonicum-liquefaciens*, and controlling the acidity during the acid producing stage of the fermentation to maintain a hydrogen ion concentration favorable to the production of neutral rather than acidic end products.

4. A process for the production of butyl alcohol, acetone, and ethyl alcohol which comprises subjecting a mash containing sucrose as a principal source of carbohydrate to the action of *Clostridium saccharo-butyl-acetonicum-liquefaciens*, providing in said mash nitrogenous nutrient in the form of an ammonium compound, and supplying alkaline neutralizing agents to the fermenting mash to control the hydrogen ion concentration whereby the final pH secured by the action of the bacteria falls within the range 5.2–6.4.

5. A process for the production of butyl alcohol, acetone, and ethyl alcohol which comprises subjecting a molasses mash to the action of *Clostridium saccharo - butyl-acetonicum - liquefaciens*, providing in said mash nitrogenous nutrient in the form of an ammonium compound, and supplying alkaline neutralizing agents to the fermenting mash to control the hydrogen ion concentration whereby the final pH secured by the action of the bacteria falls within the range 5.2–6.4.

6. A process for the production of butyl alcohol, acetone, and ethyl alcohol which comprises subjecting a molasses mash to the action of *Clostridium saccharo-butyl-acetonicum-liquefaciens*, providing in said mash nitrogenous nutrient in the form of an ammonium compound, and providing calcium carbonate in a concentration slightly in excess of that required to neutralize any initial acidity of the mash, whereby the final pH secured by the action of the bacteria falls within the range 5.6–6.2.

7. A process for the production of butyl alcohol, acetone, and ethyl alcohol which comprises subjecting a molasses mash to the action of *Clostridium saccharo-butyl-acetonicum-liquefaciens*, and supplying ammonium hydroxide to the fermenting mash in the form of a number of small additions distributed during the acid producing stage of the fermentation to control the hydrogen ion concentration whereby the final pH secured by the action of the bacteria falls within the range 5.6–6.2.

8. A process for the production of butyl alcohol, acetone, and ethyl alcohol which comprises subjecting a molasses mash to the action of *Clostridium saccharo-butyl-acetonicum-liquefaciens*, and supplying ammonium hydroxide to the fermenting mash in an amount approximately equivalent to 1.4% $NH_3$, based on the weight of the sugar in the mash, the said ammonium hydroxide being incorporated in the fermenting mash in the form of approximately ten additions of increasing amounts distributed during the acid producing stage of the fermentation.

CORNELIUS F. ARZBERGER.